United States Patent [19]
Dreyer, Jr. et al.

[11] Patent Number: 4,791,540
[45] Date of Patent: Dec. 13, 1988

[54] LIGHT FIXTURE PROVIDING NORMALIZED OUTPUT

[75] Inventors: John F. Dreyer, Jr.; Neal T. Strand, both of St. Paul, Minn.

[73] Assignee: Minnesota Mining and Manufacturing Company, St. Paul, Minn.

[21] Appl. No.: 53,848

[22] Filed: May 26, 1987

[51] Int. Cl.⁴ .............................................. F21V 5/02
[52] U.S. Cl. ..................................... 362/331; 362/97; 362/309; 362/31; 362/33
[58] Field of Search ...................... 362/309, 31, 97, 33, 362/23, 26, 29, 30, 339, 223, 224, 329, 245, 331

[56] References Cited
U.S. PATENT DOCUMENTS

| | | | |
|---|---|---|---|
| 2,016,467 | 10/1935 | Von Toll | 362/309 |
| 2,050,429 | 8/1936 | Dorey et al. | 362/224 |
| 3,532,876 | 10/1970 | Müller et al. | 362/309 |
| 4,223,651 | 11/1980 | Fabbri | 362/223 |
| 4,460,942 | 7/1984 | Pizzuti et al. | 362/223 |

*Primary Examiner*—Ira S. Lazarus
*Assistant Examiner*—Sue Hagarman
*Attorney, Agent, or Firm*—Donald M. Sell; Stephen W. Buckingham

[57] ABSTRACT

A light fixture providing normalized output. An undirected light source is located in an optical cavity having an optical window. A film with a smooth surface and a structured surface is placed in the optical window with the smooth surface facing the interior of the optical cavity. The structured surface has a plurality of triangular prisms thereon.

5 Claims, 4 Drawing Sheets

LIGHT FIXTURE PROVIDING NORMALIZED OUTPUT

TECHNICAL FIELD

The present application relates to light fixtures, and more particularly to light fixtures providing normalized light output from extended linear light sources having undirected output characteristics.

BACKGROUND ART

A light fixture that emits light in only a narrow range of directions is said to provide normalized output. Such light sources are often desirable. Because most light sources in common use produce an undirected output, some technique must be used to normalize the light they emit. One common method of normalizing the output of a light source is the use of a parabolic reflector. Such a reflector will produce a collimated beam of light from a point source.

The problem becomes more difficult when the light source is an extended linear light source, such as a common fluorescent lighting tube. Light from a fluorescent tube may be partially collimated by a reflector which is parabolic along a cross-section running perpendicular to the major axis of the tube. This technique will normalize the direction of the light that is emitted perpendicular to the tube, but not the light that is emitted in other directions.

Another technique that is commonly used with extended linear light sources involves positioning louvers in front of the light source. Such louvers allow only light traveling in the normalized direction to pass.

Both of these techniques suffer from common disadvantages. One such disadvantage is that light fixtures utilizing them are necessarily bulky. Parabolic reflectors, by their very nature, must be deep in relation to the size of the aperture. This is particularly true if the parabolic reflector is to normalize wide angle light. Similarly, if the louvers are to have a significant normalizing effect they must be reasonably deep.

A second disadvantage of both of these techniques particularly when a fluorescent tube is used as a light source for a light fixture which is to be used as an area source, is that both will produce brighter areas, commonly known as "hot spots". Hot spots normally arise in the portions of the light fixture closest to the light source. If such hot spots are to be avoided, other techniques must be used.

DISCLOSURE OF INVENTION

In the light fixture of the invention an extended linear light source having undirected output characteristics is located in an optical cavity having an optical window. A transparent film having a smooth surface and a structured surface lies in the optical window with the smooth surface facing the interior of the optical cavity.

The structured surface has a plurality of triangular prisms thereon. The prisms will totally internally reflect light entering the film perpendicular to the smooth surface, causing that light to remain in the optical cavity. The combined effect of the smooth surface and the prisms on the structured surface will, however, be to normalize the majority of the light entering the film at an angle other than perpendicular to the smooth surface so that it exits the film at an angle closer to perpendicular than the angle at which it entered.

DETAILED DESCRIPTION

Figure 1:
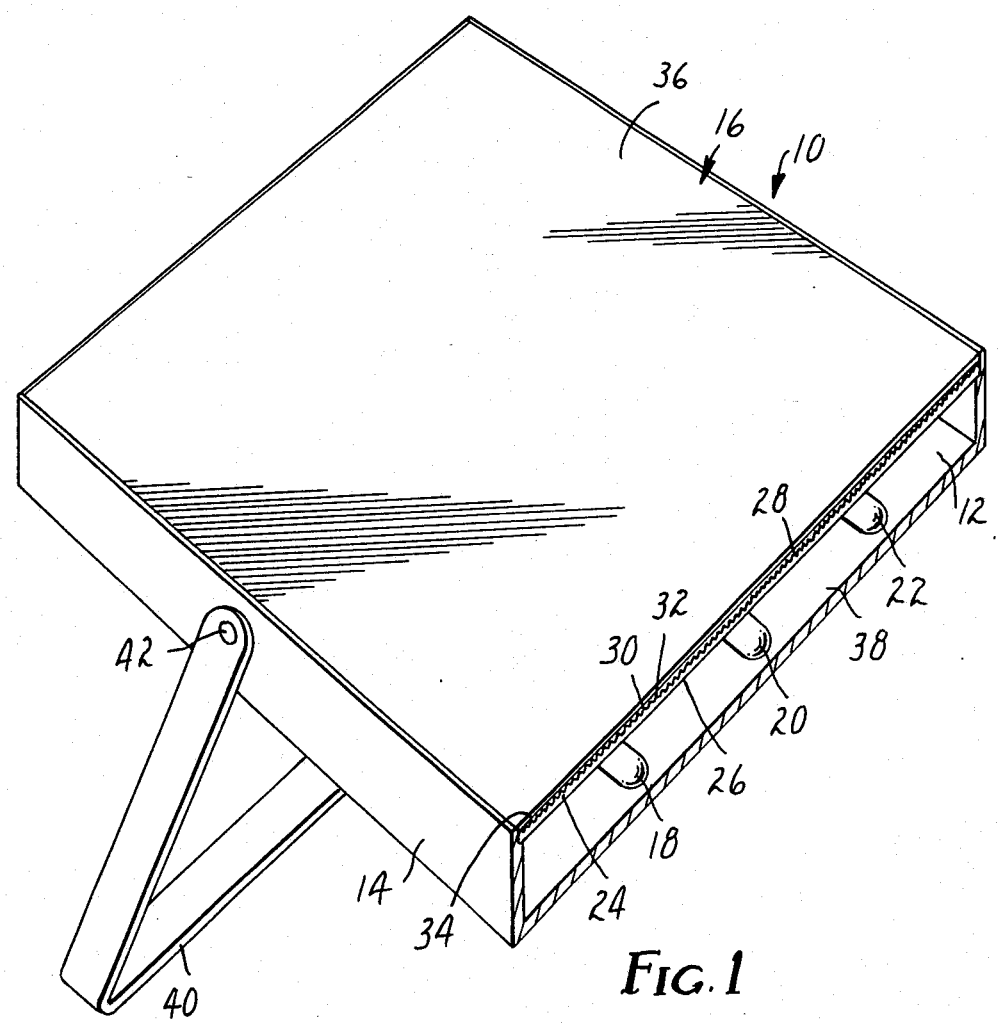
FIG. 1 is an elevation view of an embodiment of the invention.

FIG. 1 shows a light fixture 10 according to the invention. Light fixture 10 includes an optical cavity 12 defined by case 14. Optical cavity 12 has an optical window 16. Within optical cavity 12 are extended linear light sources 18, 20 and 22. Extended linear light sources 18, 20 and 22 could be, for example, conventional fluorescent lighting tubes. The number of such tubes included in optical cavity 12 is not critical to the invention. The number used should be chosen to provide the desired amount of light output.

In optical window 16 is a transparent film 24. Transparent film 24 may be, for example, of a polymer material such as an acrylic or a polycarbonate, and has a smooth surface 26 facing the interior of optical cavity 12 and a structured surface 28 facing the exterior of optical cavity 12. Structured surface 28 has a plurality of triangular prisms, such as prisms 30 and 32, forming a series of ridges and grooves thereon. Each of these prisms has a major axis that runs parallel to the major axes of extended linear light sources 18, 20 and 22. The invention has been found to work when the major axes of the triangular prisms run perpendicular to the major axes of the extended linear light sources, as well. In a preferred embodiment these prisms form right isosceles triangles, although triangles having other angles may be used.

Also in optical window 16, and exterior to film 24, is a film 34 that may be transparent or diffusely transmissive to light. Film 34 could be of an acrylic material. If film 34 is diffusely transmissive it will help to provide a more even appearance to the light exiting optical cavity 12 through optical window 16. Film 34 also provides physical protection to the prisms on structured surface 28 of transparent film 24. Film 34 has an exterior surface 36.

A layer of reflective material 38 is placed on the interior of case 14. Reflective material 38 may be a highly specularly reflective material, such as a mirror, or may be a diffusely reflective material. Bonded nonwoven films of polyolfin fibers have proven to be effective as such diffuse reflectors. Reflector 38 could also be the same type of film as film 24. If a film having a structured surface like film 24 is used as the reflector, the triangular prisms should run perpendicular to the direction of extended linear light sources 18, 20 and 22 and the smooth surface of the film should face the interior of optical cavity 12. In one embodiment reflector 38 is a two layer reflector having a layer of diffusely reflective material adjacent to case 14 with a film similar to film 24 overlying the diffusely reflective material. In the embodiment of the invention shown in FIG. 1, a leg 40 is also shown. Leg 40 is attached to case 14 by hinge 42. Leg 40 may be placed in the position shown in FIG. 1 when light fixture 10 is in use or may be folded out of the way to make light fixture 10 more compact for storage or transportation.

When light fixture 10 is to be used, leg 40 is positioned as shown and extended linear light sources 18, 20 and 22 are energized. Some of the light from light sources 18, 20 and 22 reaches film 24 directly while other light reaches film 24 after reflection from reflector 38. Most of the light which enters film 24 in a direction other than near perpendiular to smooth surface 26 will be refracted so that it emerges from film 24 in a direction which is closer to perpendicular to surface 26 of film 24.

In use a slide, such as an overhead transparency, is placed on surface 36 of film 34. Light emerging from optical cavity 12 through film 24 and film 34 will illuminate the slide, allowing it to be viewed without requiring the use of a projector.

Figure 2:
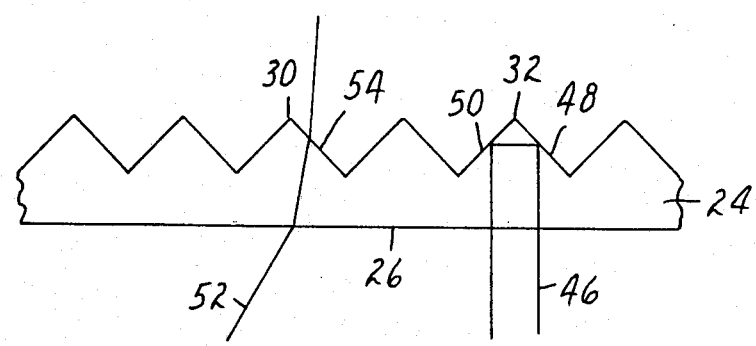
FIG. 2 is a schematic view of a light normalizing film used in the invention.

The function of film 24 in the invention may be seen by reference to FIG. 2. FIG. 2 shows a portion of film 24 including triangular prisms 30 and 32. A ray of light 46 enters film 24 through smooth surface 26. Light ray 46 strikes facet 48 of prism 32 and is totally internally reflected. The reflected ray then strikes facet 50 of prism 32 and is again totally internally reflected so that light ray 46 emerges through surface 26. Thus, light which enters film 24 perpendicular or near perpendicular to smooth surface 26 is reflected back into optical cavity 12 of FIG. 1. Light which enters smooth surface 26 at an angle other than perpendicular to surface 26, however, is treated differently. Light beam 52 enters film 24 through surface 26 at an angle other than perpendicular to surface 26. As light ray 52 enters film 24 it is refracted at surface 26. Light ray 52 is again refracted as it emerges through facet 54 of prism 30 of film 24. Therefore light ray 52 emerges from film 24 at an angle closer to the normal to surface 26 than the angle at which it entered.

The effect of film 24 provides several advantages to the light fixture of the invention. The first advantage is that the refraction of light that enters the film at an angle other than near perpendicular to the smooth surface will cause that light to exit in a more highly directed beam. A second advantage relates to the fact that the light that enters film 24 in a direction perpendicular or near perpendicular to the smooth surface is reflected back into the optical cavity. Because the portion of the light that is so reflected will be greater in the portions of the film closest to the light sources this effect helps to provide an even illumination of the optical window, eliminating hot spots present in other light fixtures. A third advantage occurs for some types of light sources. Some of the light that is reflected by film 24 will be reflected back into the light source that emitted it. When light is directed back into some types of light sources, such as filament sources, the electrical efficiency of the light source is improved. Thus the present invention provides several advantages over the prior art.

Figure 3:
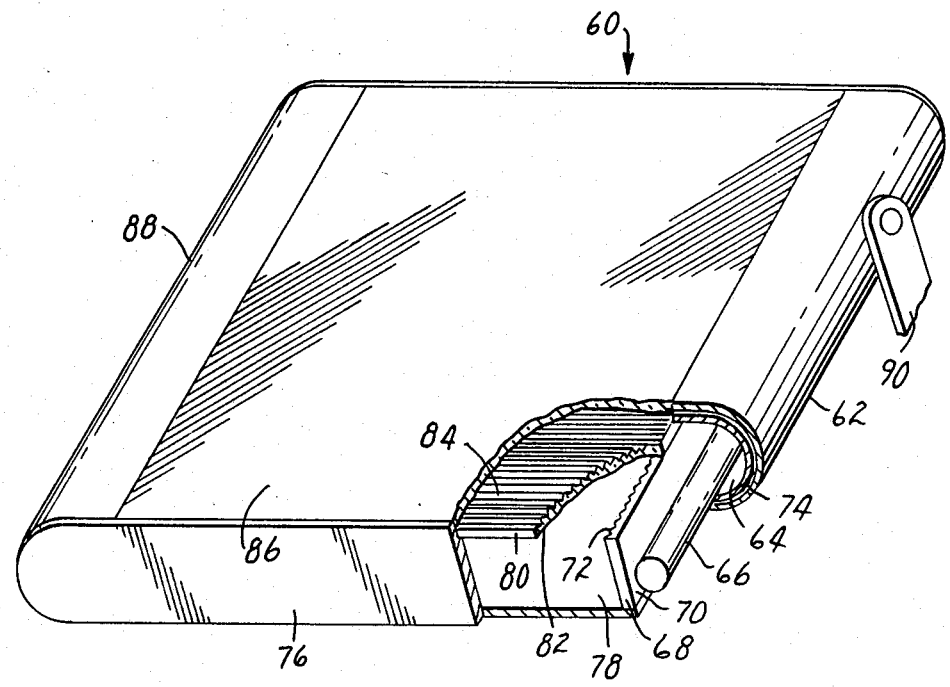
FIG. 3 is an elevation view of an alternative embodiment of the invention.

FIG. 3 shows another embodiment of the invention. The embodiment of FIG. 3 is also intended for use in viewing slides such as overhead transparencies. Light fixture 60 of FIG. 3 has a case 62 defining an optical cavity 64. Within optical cavity 64 is an extended linear light source 66. Extended linear light source 66 could again be, for example, a conventional fluorescent lighting tube. Optical cavity 64 has an optical window with a transparent film 68 therein. Transparent film 68 has a smooth side 70 and a structured side 72. The structures of structured sides 72 of film 68 are the same as the structures of structured side 28 of film 24 of FIG. 1. As shown in FIG. 3, however, the major axes of the triangular prisms of structured sides 72 of film 68 run perpendicular to the major axis of extended linear light source 66. The prisms of film 68 could be placed parallel to extended linear light source 66, but experimentation has shown that better results are achieved when the film is arranged in the manner shown in FIG. 3. The critical element, however, is that structured side 72 must face the exterior of optical cavity 64, while smooth side 70 of film 68 must face the interior of optical cavity 64.

Additionally shown in optical cavity 64 is reflector 74. Reflector 74 could be any of the materials described for use as reflectors on the interior of optical cavity 12 of FIG. 1.

The light fixture of FIG. 3 additionally has a case 76 which defines a second optical cavity 78. Optical cavity 78 has an input optical window adjacent to the optical window of optical cavity 64. Thus, light emerging from optical cavity 64 through film 68 will enter optical cavity 78 through the input optical window.

Optical cavity 78 also has an output optical window having a film 80 therein. Film 80 has a smooth surface 82 facing the interior of optical cavity 78 and a structured surface 84 facing the exterior of optical cavity 78. Structured surface 84 of film 80 is again the same as structured surface 72 of film 68 or structured surface 28 of film 24 of FIG. 1. The major axes of the triangular prisms of structured surface 84 of film 80 run perpendicular to the major axis of extended linear light source 66. Finally, light diffusing film 86 overlies structured surface 84 of film 80 and the output optical window of optical cavity 78.

Optical cavity 78 will typically have a reflector lining the interior of case 76. The reflector on the interior of optical cavity 78 may be any of the reflective materials described for use on the interior of optical cavity 12 of FIG. 1. Diffusely reflecting materials are preferred, however.

In the preferred embodiment of the invention, case 88 defines a third optical cavity having a second extended linear light source therein. This third optical cavity cooperates with optical cavity 78 in a manner entirely analogous to that of optical cavity 64. Also included in the preferred embodiment is leg 90 which functions in a manner similar to leg 40 of FIG. 1 to stand light fixture 60 in a desired orientation for viewing.

Figure 4:
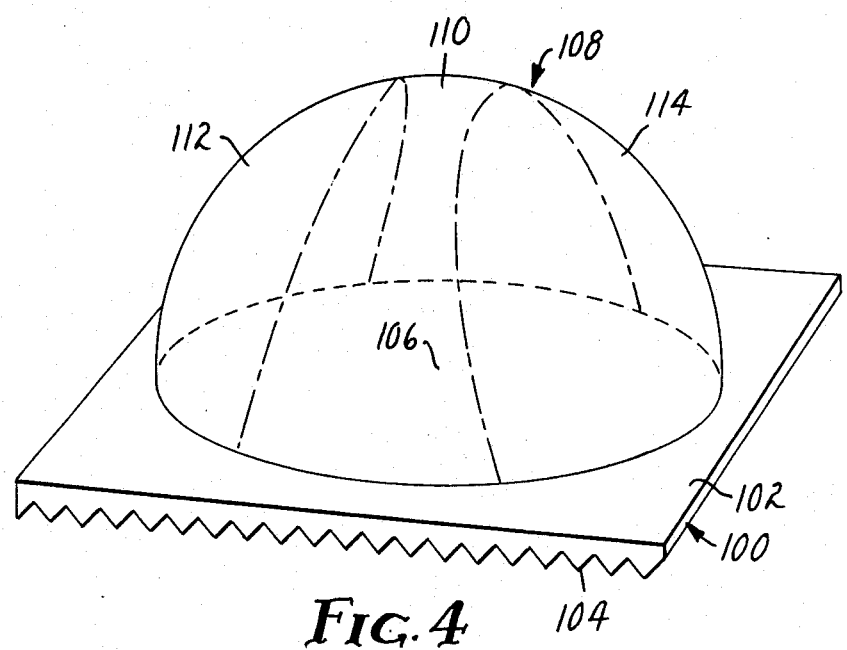
FIG. 4 is a schematic view showing light input characteristics of the light normalizing film used in the invention.
Figure 5:
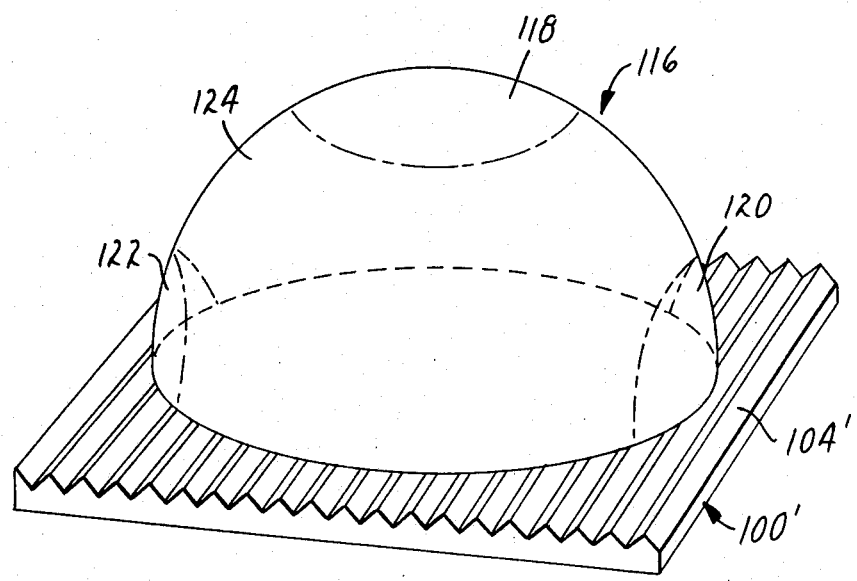
FIG. 5 is a schematic view showing light output characteristics of the film used in the invention.
Figure 6:
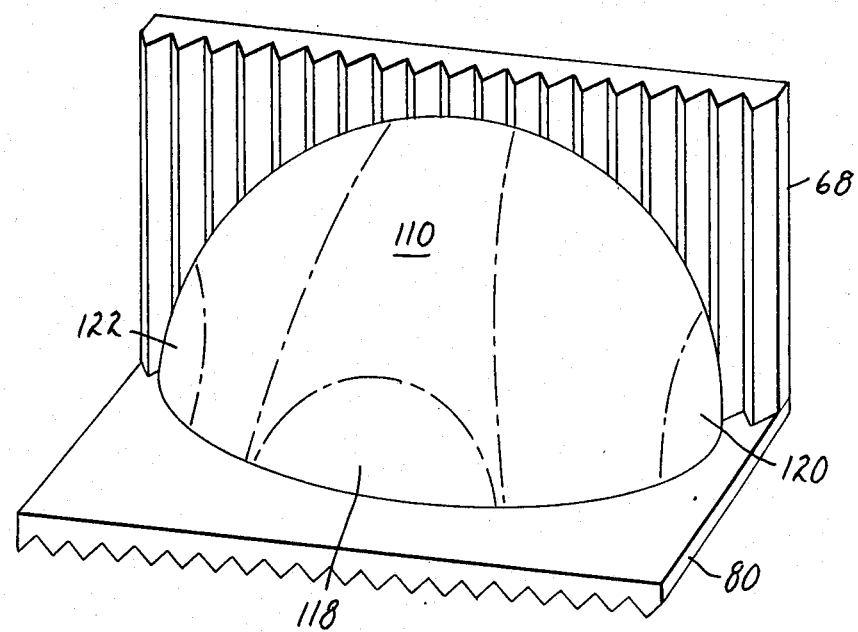
FIG. 6 is a schematic view combining the input and output characteristics of FIGS. 4 and 5 to show the operation of the embodiment of FIG. 3.

The operation of a light fixture according to the invention may be better understood by reference to FIGS. 4, 5 and 6. Turning first to FIG. 4, a film 100 is shown having a smooth surface 102 and a structured surface 104. A point 106 on smooth surface 102 is selected. All light entering film 100 through point 106 must pass through theoretical hemisphere 108 having point 106 at its center. Hemisphere 108 is divided into three portions, 110, 112 and 114. Light which enters film 100 at point 106 after passing through region 110 of hemisphere 108 will undergo total internal reflection at structured surface 104 and will re-emerge through smooth surface 102. Light which enters film 100 at point 106 after passing through regions 112 or 114 of hemisphere 108, however, will emerge from film 100 through structured surface 104. In practice the relative sizes of regions 110, 112 and 114 will vary according to the index of refraction of the material making up film 100, but the general shape will be as shown regardless of the material used.

FIG. 5 illustrates the light output distribution that will result from the light entering the film through regions 112 and 114 of FIG. 4. Light emerging from the center of hemisphere 116 of FIG. 5 must pass through that hemisphere. The majority of such light will pass through region 118. A smaller portion of the light emerging will pass through regions 120 and 122. The light that passes through regions 120 and 122 will be that small percentage of the light that undergoes only a single total internal reflection from structured surface 104' of film 100'. None of the light will emerge through region 124 of hemisphere 116.

FIG. 6 illustrates how the input and output characteristics shown in FIGS. 4 and 5 cooperate in the embodiment of the invention shown in FIG. 3. FIG. 6 shows films 68 and 80, corresponding to film 68 and 80 of FIG. 3. Light emerging from the first optical cavity through film 68 will emerge in regions 118, 120 and 122, with the great majority of that light emerging in region 118. As may be seen, however, the majority of the light emerging in region 118 will be contained within region 110, meaning that that light will not be transmitted by film 80. Instead it will be totally internally reflected by film 80 back into the second optical cavity 78 of FIG. 3. By proper choice of the indices of refraction of films 68 and 80 region 118 may be totally contained in region 110. As a result that light must be reflected at least once by the interior walls of case 76 of optical cavity 78. This helps to create a uniform light distribution within optical cavity 78. A proper choice of reflective materials lining the walls of case 76 will help further improve the uniformity of such distribution. A diffuse reflector, such as bonded, nonwoven polyolfin fibers, works very effectively to produce such a distribution. Alternatively a combination of spectral reflectors in some portions of optical cavity 78 and diffuse reflectors in other portions may be used.

The present invention has been described with respect to a light fixture which may be used for illuminating slides such as overhead transparencies. Those skilled in the art will readily perceive that the invention is not limited to such light fixtures. It may be advantageously used in any situation in which a light fixture is to have a directed output. For example, a light fixture according to the invention could be advantageously used in an overhead light fixture where light from the fixture is to be preferentially directed to a desk or other work space.

What is claimed is:

1. A light fixture having normalized light output comprising:

a case defining a first optical cavity, said optical cavity having an optical window;

a first light source in said optical cavity;

a first transparent film having first and second major surfaces in said optical window, said first major surface being smooth and facing into said optical cavity and said second major surface having a plurality of triangular prisms thereon, each of said triangular prisms having a major axis, said major axes of said prisms being parallel to one another;

a case defining a second optical cavity having a first input optical window and an output optical window, said second optical cavity input window accepting light exiting said first optical cavity through said first optical cavity optical window; and a second transparent film having first and second major surfaces in said optical window, said second transparent film first major surface being smooth and facing into said second optical cavity and said second transparent film second major surface having a plurality of triangular prisms thereon, each of said triangular prisms having a major axis, said major axes of said prisms being parallel to one another and perpendicular to said major axes of said prisms of said first transparent film.

2. The light fixture of claim 1, wherein said light source is an extended linear light source having a major axis and said major axes of said triangular prisms are perpendicular to said major axis of said first extended linear light source.

3. The light fixture of claim 1, further comprising a light diffusing film in said second optical cavity output optical window adjacent to said second transparent film second major surface.

4. The light fixture of claim 1, wherein said second optical cavity has a second input optical window said light fixture further comprising:

a case defining a third optical cavity having an optical window;

said second optical cavity second input optical window accepting light exiting said third optical cavity through said third optical cavity optical window;

a second light source in said third optical cavity; and a third transparent film in said third optical cavity optical window, said third transparent film having first and second major surfaces, said third transparent film second major surface having a plurality of triangular prisms thereon, each of said triangular prisms having a major axis, said major axes of said prisms of said third transparent film being perpendicular to said major axes of said prisms of said second transparent film.

5. The light fixture of claim 4 wherein both of said light sources are extended linear light sources.

* * * * *